(12) United States Patent
Zaharia et al.

(10) Patent No.: US 8,140,708 B2
(45) Date of Patent: Mar. 20, 2012

(54) SYSTEM AND METHOD FOR THE SERVING OF EXTENDED BIT DEPTH HIGH RESOLUTION IMAGES

(75) Inventors: Roni Zaharia, Tel Aviv (IL); Zvi Eintracht, Emerald Hills, CA (US); Alexander Ovsiankin, Sunnyvale, CA (US)

(73) Assignee: XRFiles, Inc., Emerald Hills, CA (US)

( * ) Notice: Subject to any disclaimer, the term of this patent is extended or adjusted under 35 U.S.C. 154(b) by 134 days.

(21) Appl. No.: 12/618,559

(22) Filed: Nov. 13, 2009

(65) Prior Publication Data
US 2010/0125648 A1 May 20, 2010

Related U.S. Application Data

(60) Provisional application No. 61/193,310, filed on Nov. 17, 2008.

(51) Int. Cl.
*G06F 15/16* (2006.01)
*G09G 5/02* (2006.01)

(52) U.S. Cl. .......................... 709/246; 345/600; 345/605

(58) Field of Classification Search .......... 709/246–247; 348/441–459; 345/600–605
See application file for complete search history.

(56) References Cited

U.S. PATENT DOCUMENTS

| | | | |
|---|---|---|---|
| 3,796,916 A | 3/1974 | De Belder et al. | |
| 4,860,248 A | 8/1989 | Lumelsky | 364/900 |
| 6,326,977 B1 * | 12/2001 | Westerman | 345/591 |
| 6,493,023 B1 * | 12/2002 | Watson | 348/180 |
| 6,578,002 B1 | 6/2003 | Derzay | |
| 6,934,698 B2 | 8/2005 | Judd et al. | 707/1 |
| 6,985,614 B2 | 1/2006 | Shinbata | |
| 7,127,064 B2 | 10/2006 | Shinbata | |

(Continued)

FOREIGN PATENT DOCUMENTS

EP 1496685 A2 1/2005

(Continued)

OTHER PUBLICATIONS

G.R. Thoma et al., "Access to a Digital Xray Archive over Internet", Proc. SPIE, Enabling Technologies for High Bandwidth Applications, Sep. 1992, vol. 1785, pp. 79-86, http://archive.nlm.nih.gov/pubs/adxa-internet/adxa-internet.php.

(Continued)

*Primary Examiner* — Brendan Higa
(74) *Attorney, Agent, or Firm* — Howard Zaretsky, Esq.; Woods Oviatt Gilman LLP

(57) ABSTRACT

A novel and useful system and method for the serving and display of extended bit depth (EBD) high resolution images on a web browser using multimedia platform code or code for a graphics framework. To display an EBD image, such as an x-ray or MRI image set, on a web browser, the image data is mapped into a plurality of channels of pixels of a color image which a web browser is able to handle, where each channel holds a portion of the full dynamic range of the original EBD image. At the client, a color transform is applied to the color image data which takes into account the user's desired VOI settings. The resulting display image has the exact values as if the VOI was applied to the original EBD image and is dynamically mapped to the display capabilities of the client viewing framework thus enabling a reviewer to detect any available details of the image.

38 Claims, 12 Drawing Sheets

U.S. PATENT DOCUMENTS

| | | | |
|---|---|---|---|
| 7,209,142 B1 * | 4/2007 | Agano | 345/589 |
| 7,352,893 B2 * | 4/2008 | Zeng et al. | 382/162 |
| 7,382,915 B2 | 6/2008 | Bala et al. | |
| 7,391,901 B2 | 6/2008 | de Queiroz et al. | |
| 7,457,656 B2 | 11/2008 | Judd et al. | 705/2 |
| 2002/0071041 A1 | 6/2002 | Pine | |
| 2002/0091659 A1 * | 7/2002 | Beaulieu et al. | 706/62 |
| 2003/0026474 A1 * | 2/2003 | Yano | 382/154 |
| 2003/0156765 A1 | 8/2003 | Yamamichi | |
| 2004/0130680 A1 * | 7/2004 | Zhou et al. | 352/38 |
| 2004/0247123 A1 | 12/2004 | Goldstein | |
| 2005/0008223 A1 | 1/2005 | Zeng et al. | 382/162 |
| 2005/0141001 A1 * | 6/2005 | Watanabe | 358/1.9 |
| 2006/0012839 A1 * | 1/2006 | Fukuda | 358/518 |
| 2006/0023967 A1 | 2/2006 | Hayashi et al. | |
| 2007/0150751 A1 | 6/2007 | Goldstein | |
| 2007/0269115 A1 | 11/2007 | Wang et al. | 382/232 |

FOREIGN PATENT DOCUMENTS

| | | |
|---|---|---|
| KR | 10-2006-0080438 | 7/2006 |
| KR | 10-2008-0020314 | 3/2008 |

OTHER PUBLICATIONS

PCT International Search Report PCT/ISA/210; PCT/US2009/064543, Jun. 18, 2010, WIPO, XRFiles Inc. et al.

PCT International Search Report PCT/ISA/210; PCT/US2009/064551, Jun. 28, 2010, WIPO, XRFiles Inc. et al.

* cited by examiner

SYSTEM AND METHOD FOR THE SERVING OF EXTENDED BIT DEPTH HIGH RESOLUTION IMAGES

REFERENCE TO PRIORITY APPLICATION

This application claims priority to U.S. Provisional Application Ser. No. 61/193,310, filed Nov. 17, 2008, entitled "Apparatus and methods for delivery and display of high-resolution grayscale images," incorporated herein by reference in its entirety.

FIELD OF THE DISCLOSURE

The subject matter disclosed herein relates to the field of digital imaging, and more particularly relates to a mechanism for serving and displaying extended bit depth images.

BACKGROUND OF THE DISCLOSURE

Medical imaging encompasses the techniques and processes used to create images of the human body for clinical or other medical science purposes. An array of medical imaging technologies are currently in use today. Examples include x-rays and other radiation techniques including computed tomography (CT) scanning, ultrasound, nuclear medicine, positron emission tomography (PET) and magnetic resonance imaging (MRI). Radiographs generated by projection radiography are produced by the transmission of x-rays through a patient to a capture device followed by conversion into an image for diagnosis. The original and still common imaging produces silver impregnated photographic films.

Today, however, in many fields of medicine traditional film radiographs are being replaced by digital radiology technology. In digital radiography, digital x-ray sensors are used instead of traditional photographic film. In place of x-ray film, a digital image capture device is used to record the x-ray image and make it available as a digital file that can be presented for review and interpretation. Advantages include time efficiency where the image preview is available immediately by bypassing chemical processing, images having a wider dynamic range making it more forgiving for over- and under-exposure as well as the ability to apply special image processing techniques that enhance overall display of the image and the ability to digitally transfer and enhance images. In addition, less radiation can be used to produce an image of similar contrast to conventional radiography. Further, a motivator for healthcare facilities to adopt digital radiography is its potential to reduce costs associated with processing, managing and storing films. Thus, the use of digital radiography is likely to grow significantly in the future.

BRIEF DESCRIPTION OF THE DISCLOSURE

There is thus provided a method of encoding an extended bit depth (EBD) image, the method comprising receiving EBD image data and mapping the EBD image data into a plurality of channels of pixels of a multi-channel image.

There is also provided a method of encoding an extended bit depth (EBD) image, the method comprising receiving EBD image data having a bit depth greater than 8-bits and mapping the EBD image data into a plurality of 8-bit channels of pixels of a multi-channel image, the multi-channel image having a bit depth greater than that of the EBD image.

There is further provided a method of serving extended bit depth (EBD) images to one or more clients, the method comprising retrieving the EBD image data from storage, transmitting the EBD image data to the client and wherein the bit depth of the EBD image is greater than that of a channel of the client.

There is also provided a method of serving extended bit depth (EBD) images to one or more clients, the method comprising transmitting multi-channel image data corresponding to the EBD image data, the EBD image data mapped into a plurality of channels of pixels of the multi-channel image.

There is further provided a server for serving extended bit depth images to one or more clients comprising a storage system for storing multi-channel images, each multi-channel image generated by mapping corresponding EBD image data into a plurality of channels of a multi-channel image, a network interface operative to connect the server to a network, a server comprising a memory including a program that receives requests for EBD images from clients, that retrieves multi-channel images corresponding to the requested EBD images from the storage system, and that transmits the multi-channel images over the network to the requesting client and a processor for executing the program.

There is also provided a server for serving extended bit depth images to one or more clients comprising a storage system for storing multi-channel images, each multi-channel image generated by mapping corresponding EBD image data into a plurality of channels of a multi-channel image, a server operative to retrieve a multi-channel image corresponding to the EBD image from the storage system and transmit the multi-channel image to the client.

There is further provided a computer program product characterized by that upon loading it into computer memory a method of serving extended bit depth (EBD) images to one or more clients is executed, the computer program product comprising a computer usable medium having computer usable program code embodied therewith, the computer usable program code comprising computer code configured to retrieve multi-channel image data corresponding to the EBD image data from storage, the EBD image data mapped a priori into a plurality of channels of the multi-channel image and computer usable code configured to transmit the multi-channel image data to the requesting client.

BRIEF DESCRIPTION OF THE DRAWINGS

The invention is herein described, by way of example only, with reference to the accompanying drawings, wherein.

DETAILED DESCRIPTION OF THE DISCLOSURE

Notation Used Throughout

The following notation is used throughout this document:

| Term | Definition |
| --- | --- |
| ASIC | Application Specific Integrated Circuit |
| CDROM | Compact Disc Read Only Memory |
| CMYK | Cyan, Magenta, Yellow, Black |
| CPU | Central Processing Unit |
| CT | Computed Tomography |
| DICOM | Digital Imaging and Communications in Medicine |
| DSP | Digital Signal Processor |
| DVD | Digital Versatile Disc |
| EBD | Extended Bit Depth |
| EPROM | Erasable Programmable Read-Only Memory |
| FPGA | Field Programmable Gate Array |
| FTP | File Transfer Protocol |
| GDI | Graphics Device Interface |
| GDK | GIMP Drawing Kit |
| GPU | Graphics Processing Unit |
| HTTP | Hyper-Text Transport Protocol |
| IP | Internet Protocol |
| JPEG | Joint Photographic Experts Group |
| LAN | Local Area Network |
| LUT | Lookup Table |
| MAC | Media Access Control |
| MAN | Metropolitan Area Network |
| MRI | Magnetic Resonance Imaging |
| NIC | Network Interface Card |
| OS | Operating System |
| PC | Personal Computer |
| PDA | Personal Digital Assistant |
| PET | Positron Emission Tomography |
| PNA | Personal Navigation Assistant |
| PNG | Portable Network Graphics |
| RAM | Random Access Memory |
| RF | Radio Frequency |
| RGB | Red, Green, Blue |
| RGBA | Red, Green, Blue, Alpha |
| ROI | Region of Interest |
| ROM | Read Only Memory |
| RUIM | Removable User Identity Module |
| SAN | Storage Area Network |
| SIM | Subscriber Identity Module |
| SMTP | Simple Mail Transfer Protocol |
| TCP | Transmission Control Protocol |
| VOI | Values of Interest |
| WAN | Wide Area Network |
| WC | Window Center |
| WW | Window Width |
| WWAN | Wireless Wide Area Network |

DETAILED DESCRIPTION

A novel and useful system and method for the serving and display of extended bit depth (EBD) high resolution images on a web browser using multimedia platform code or code for a graphics framework. To display an EBD image, such as a grayscale x-ray or MRI image set, on a web browser, the mechanism serves image data. The color image data comprises EBD image data mapped to a plurality of color channels of pixels of a color image, where each color channel holds a portion of the full dynamic range of the EBD image. On the client end, a transform is applied to the color image data which takes into account the user's desired VOI settings. The resulting display image has the exact values as if the VOI was applied to the original EBD image and is dynamically mapped to the display capabilities of the client viewing framework thus enabling a reviewer to detect any available details of the image.

Client/Server System

Figure 1:
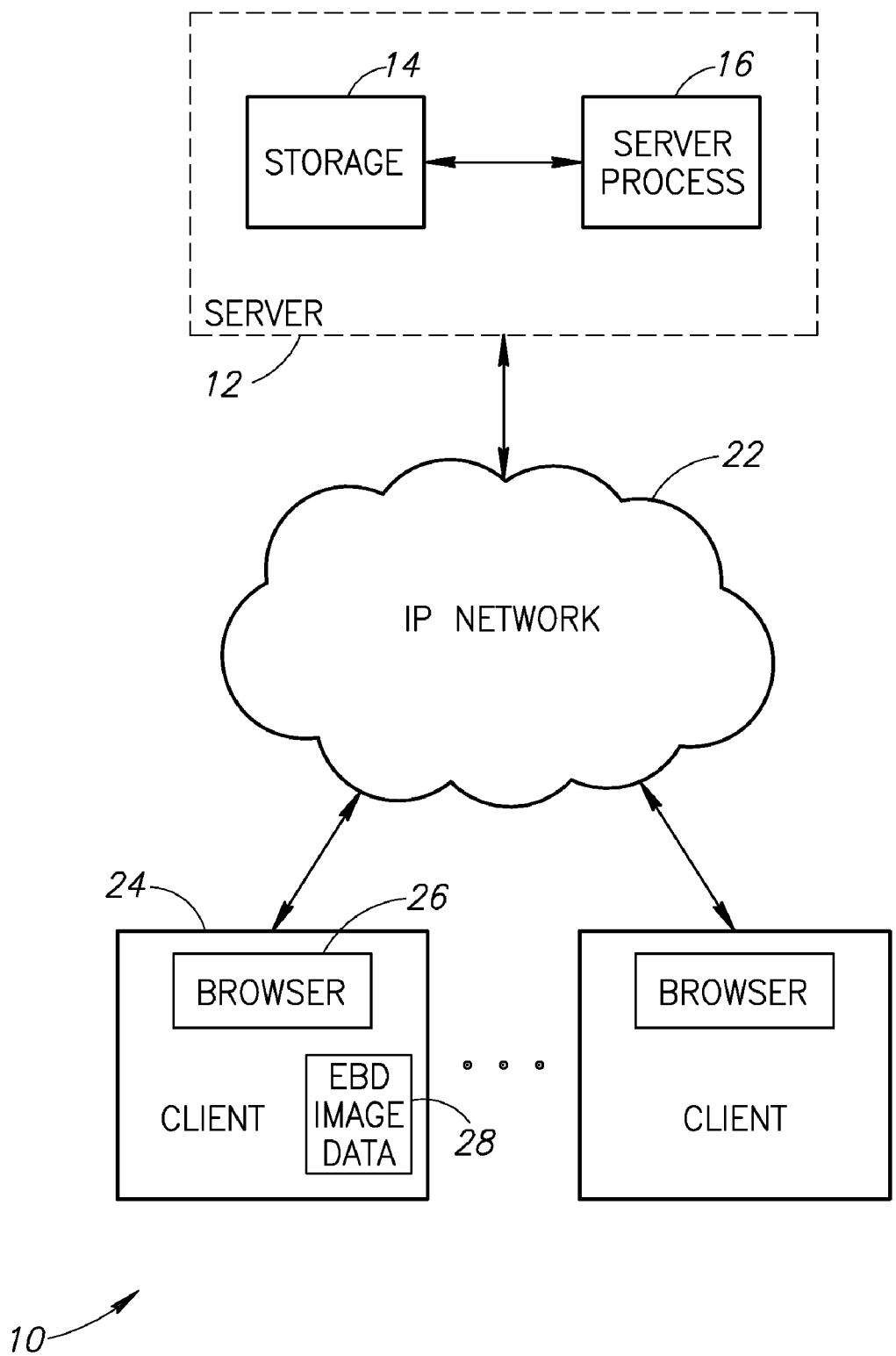
FIG. 1 is a block diagram illustrating an example client server system for the serving and display of extended bit depth (EBD) images.

A block diagram illustrating a client server system for the serving and display of grayscale extended bit depth (EBD) images is shown in FIG. 1. The system, generally referenced 10, comprises a server 12 in communication with a plurality of clients 24 over an IP based network 22. The server 12 comprises a server process 16 in communication with storage 14. The server process and storage may be implemented in any suitable manner such as, dedicated computer servers (e.g., file server, web server, etc.) and attached storage, cloud computing where the server and storage functions are implemented as scalable and virtualized resources. Regardless of the implementation, the function of the server is to serve data, files, images, etc. to the client in response to requests. The client 24 may comprise a computer (handheld, PC, etc.) running a multimedia platform enhanced web browser or a graphics framework based application.

The IP network 22 may comprise any suitable communications means such as the Internet and the World Wide Web (WWW), Intranet, wide area network (WAN), local area network (LAN), wireless wide area network (WWAN), storage area network (SAN), a metro area network (MAN), etc. The server 16, storage 14 and client 24 communicate with each other using any suitable language/protocol such as SMTP, HTTP, TCP/IP, etc. Those having ordinary skill in the art will recognize that any of a variety of communication networks and protocols may be used to implement the EBD image server and delivery mechanism.

The storage 14 is operative to store EBD grayscale images, for example, x-ray or MRI images, at an extended bit depth that exceeds that of what a browser is able to handle. For example, the EBD may comprise 12-bits, 16-bits, 24-bits, or more, while the available bit depth of the web browser is usually 8-bits. In addition, in one embodiment, the storage is operative to store color images generated by the server. The server maps the EBD image data into the plurality of channels of color pixels to generate the color image to facilitate both transport of the image to the client and the application of a color transform on the client. Clients (or nodes) 24 are connected to the network 22 and, depending on the embodiment, are operative to request either EBD images or color images from the server using a web browser with a multimedia platform extension installed therein.

A user is capable of not only viewing the EBD image but also dynamically setting one or more viewing parameters, that can be set for example, by the user adjusting the window leveling setting, selecting presets or even by algorithms for automatic window leveling, and is presented the important information from the original EBD data as embodied in the user's viewing parameters (e.g., values of interest (VOI)) in accordance with the mechanism described in more detail infra.

In an example embodiment, the viewer (i.e. web browser) used on the client side comprises a multimedia platform extension and uses its display capabilities to reach the desired effect of reviewing an EBD grayscale image. It is noted that while the system is described herein as a system having a client/server architecture, the mechanism is not limited thereto. Specifically, standalone systems are also contemplated. In an example embodiment, the storage 14 on the server is replaced by a data file available in a folder, local memory, local storage, etc. of the client. In this case, the server process implements file server functionality and is operative to transfer files, images, etc. to the client in response to requests received over the network. The data file being provided to the client either by delivery over a network (either as an EBD or color image) or by means of tangible media readable by such a system, including but not limited to, memory sticks, thumb drives, compact disks (CDs), DVD disks, etc. Other ways of providing the image data to the client are also possible and are contemplated by this disclosure.

In one embodiment, the client 24 comprises a personal computer (e.g., MAC, PC, Linux based, iPhone, etc) operating with an Intel or AMD microprocessor or other microprocessor, for example. The client includes a cache and suitable storage device, such as a high-capacity disk, CDROM, DVD, flash memory, and/or other solid state memory, etc. In another embodiment, the client is a handheld computer such as a smartphone, PDA, etc.

Note that the web browser on the client may comprise any suitable browser such as Mozilla Firefox, Apple Safari, Microsoft Internet Explorer, Google Chrome, Opera, etc. The server communicates with the web browser in the client over the network 22 and is operative to receive EBD or color image data stored in storage 14 or provided to the client using any other suitable means.

Computer Processing System

As will be appreciated by one skilled in the art, the EBD image server and delivery mechanism may be embodied as a system, method, computer program product or any combination thereof. Accordingly, the mechanism may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the mechanism may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM), a Flash memory, an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the mechanism may be written in any combination of one or more programming languages, including an object oriented programming language such as Java, Smalltalk, C++ or the like and conventional procedural programming languages, such as the "C" programming language or a scripting language such as JavaScript, a machine level language such as Assembler, other programming languages or code written for any suitable multimedia platform or graphics framework. The program code may execute entirely on the user's computer, partly on the user's computer, on a GPU within the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The mechanism is described below with reference to flowchart illustrations and/or block diagrams of methods, apparatus (systems) and computer program products according to embodiments of the mechanism. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
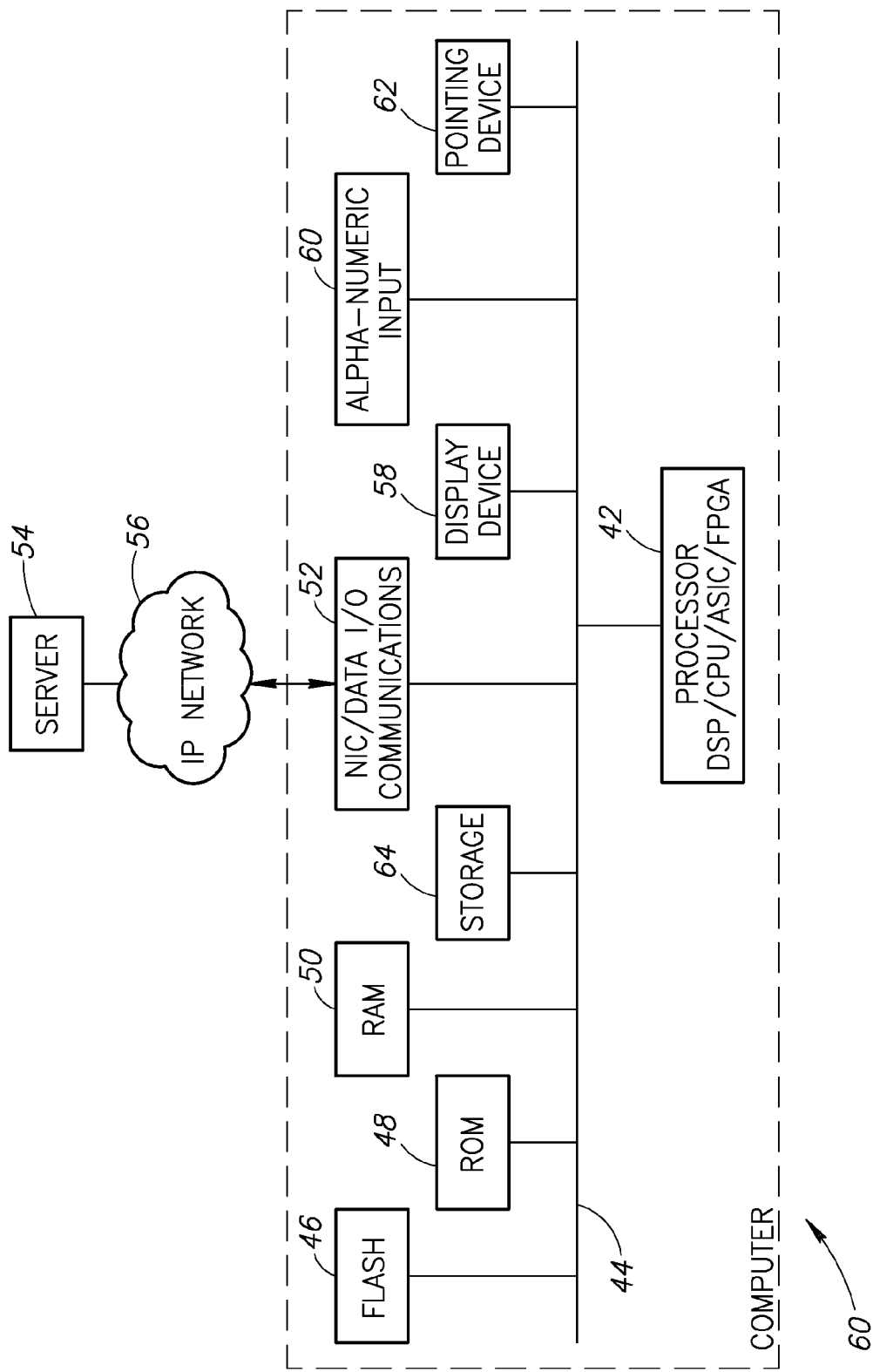
FIG. 2 is a block diagram illustrating an example computer processing system for implementing the EBD image server and display mechanism.

A block diagram illustrating an example computer processing system for implementing the EBD image server and delivery mechanism is shown in FIG. 2. The computer system, generally referenced 40, comprises a processor 42 which may comprise one or more of: a digital signal processor (DSP), central processing unit (CPU), microcontroller, microprocessor, microcomputer, ASIC or FPGA core or other computer system implementations. The system may also comprise static read only memory 48 and dynamic main memory 50 all in communication with the processor. The processor is also in communication, via bus 44, with a number of peripheral devices that are also included in the computer system. Peripheral devices coupled to the bus include a display device 58 (e.g., monitor), alpha-numeric input device 60 (e.g., keyboard) and pointing device 62 (e.g., mouse, tablet, etc.)

The computer system communicates with a server 54 over one or more external networks such as IP network 56 (e.g., LAN/WAN/SAN) over communication lines connected to the system through a data I/O communications interface 52 (e.g., network interface card or NIC). The network adapters 52 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device or other type of storage 64 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the EBD image server and delivery mechanism resides on a computer readable medium, such as a magnetic disk within a disk drive unit or other storage device. Alternatively, the computer readable medium may comprise a floppy disk, removable hard disk, Flash memory 46, EEROM based memory, bubble memory storage, ROM storage, distribution media, intermediate storage media, execution memory of a computer, and any other medium or device capable of storing for later reading by a computer a computer program implementing the mechanism of this invention. The software adapted to implement the EBD image server and delivery mechanism may also reside, in whole or in part, in the static or dynamic main memories or in firmware within the processor of the computer system (i.e. within microcontroller, microprocessor or microcomputer internal memory).

Other digital computer system configurations can also be employed to implement the EBD image server and delivery mechanism, and to the extent that a particular system configuration is capable of implementing the system and methods of this mechanism, it is equivalent to the representative digital computer system of FIG. 2 and within the spirit and scope of this mechanism.

Once they are programmed to perform particular functions pursuant to instructions from program software that implements the system and methods of this mechanism, such digital computer systems in effect become special purpose computers particular to the mechanism. The techniques necessary for this are well-known to those skilled in the art of computer systems.

It is noted that computer programs implementing the system and methods of this mechanism will commonly be distributed to users on a distribution medium such as floppy disk or CDROM or may be downloaded over a network such as the Internet using FTP, HTTP, or other suitable protocols. From there, they will often be copied to a hard disk or an intermediate storage medium. When the programs are to be run, they will often be loaded either from their distribution medium or their intermediate storage medium into the execution memory of the computer, configuring the computer to act in accordance with the method of this invention. All these operations are well-known to those skilled in the art of computer systems.

Alternatively, in the case of modern web computing, the data (e.g., image data) and code embodying the client portion of the mechanism (e.g., code to implement the color transform, described in more detail infra) are coupled together, stored on the server and downloaded by the client framework on demand when required. An example of this is the Web 2.0 programming paradigm Ajax, a popular web development technique used on the client-side to create interactive web applications. This applies similarly to HTML, JavaScript, ActionScript and other multimedia platform programming languages.

The flowchart and block diagrams in the Figures illustrate the architecture, functionality, and operation of possible implementations of systems, methods and computer program products according to various embodiments of the mechanism. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Mobile Communications Device Embodiment

Figure 3:
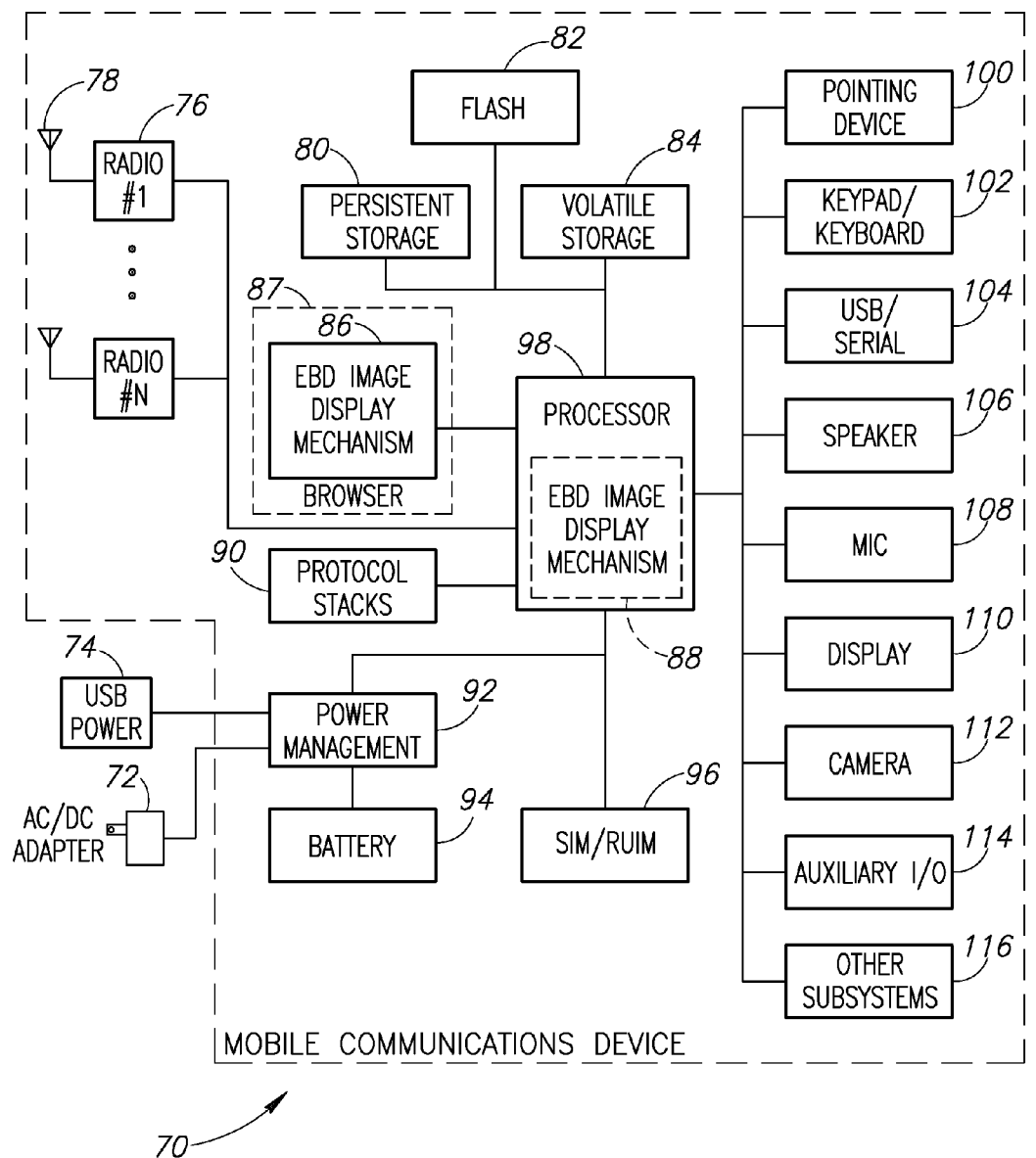
FIG. 3 is a simplified block diagram illustrating an example mobile communication device incorporating the EBD image display mechanism.

A block diagram illustrating an example mobile communication device incorporating the EBD image display mechanism is shown in FIG. 3. The mobile communication device is preferably a two-way communication device having voice and data communication capabilities. In addition, the device optionally has the capability to communicate with other computer systems via the Internet. Note that the mobile communications device (or mobile device) may comprise any suitable wired or wireless device such as multimedia player, mobile communication device, cellular phone, smartphone, Personal Digital Assistant (PDA), Personal Navigation Assistant (PNA), Bluetooth enabled device, handheld device, etc. For illustration purposes only, the device is shown as a mobile device, such as a cellular based smartphone. Note that this example is not intended to limit the scope of the mechanism as it can be implemented in a wide variety of communication devices. It is further appreciated the mobile device 70 shown is intentionally simplified to illustrate only certain components, as the mobile device may comprise other components and subsystems 116 beyond those shown.

The mobile device, generally referenced 70, comprises a processor 98 which may comprise a baseband processor, CPU, microprocessor, DSP, etc., optionally having both analog and digital portions. The mobile device may comprise a plurality of radios 76 and associated antennas 78. Radios for the basic cellular link and any number of other wireless standards and Radio Access Technologies (RATs) may be included. Examples include, but are not limited to, Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc. The mobile device also comprises protocol stacks 90, which may or may not be entirely or partially implemented in the processor 98. The protocol stacks implemented will depend on the particular wireless protocols required.

The mobile device may also comprise internal volatile storage 84 (e.g., RAM) and persistence storage 80 (e.g., ROM) and Flash memory 82 and other forms of memory. Persistent storage 80 also stores applications executable by processor 98 including the related data files used by those applications to allow device 70 to perform its intended functions. Several user-interface devices may include a pointing device (e.g., trackball, touch pad, etc.) 100 used for navigation, selection of menu choices and confirmation of action, keypad/keyboard 102 such as arranged in QWERTY fashion for entering alphanumeric data and a numeric keypad for entering dialing digits and for other controls and inputs (the keyboard may also contain symbol, function and command keys such as a phone send/end key, a menu key and an escape key), microphone(s) 108, speaker(s) 106 and associated audio codec or other multimedia codecs, signaling device (not shown) for alerting a user, camera and related circuitry 112, display(s) 110 and associated display controller. A serial/USB or other interface connection 104 (e.g., SPI, SDIO, PCI, USD, etc.) provides a serial link to a user's PC or other device. SIM/RUIM card 96 provides the interface to a user's Subscriber Identity Module (SIM) or Removable User Identity Module (RUIM) card for storing user data such as address book entries, user identification, etc.

Portable power is provided by the battery 94 coupled to power management circuitry 92. External power is provided via USB power 74 or an AC/DC adapter 72 connected to the power management circuitry 92 which is operative to manage the charging and discharging of the battery 94.

The mobile communications device is also adapted to implement the EBD image display mechanism. The EBD image display mechanism may be implemented as code written in the language of a multimedia platform and adapted to run within the web browser 87 running as a task in the operating system of the device 70. Alternatively, the mechanism can be implemented as a standalone application written in the language of a graphics framework, as a task stored in external memory executed by the processor 98, or implemented as a task 88 executed from memory embedded in the processor 98. Note that the mechanism may be implemented as hardware, software or as a combination of hardware and software. Implemented as a software task, the program code operative to implement the mechanism is stored in one or more memories 80, 82, 84, local memories within the processor 98, downloaded from a server or other suitable means.

Extended Bit Depth (EBD) Image Server and Display

Currently, the images generated by digital radiography, whether from x-rays, digital mammography, magnetic resonance imaging (MRI), or other types of medical image sets, are made up of pixels having bit depths of eight or more bits per pixel, e.g., 16-bits, etc. Extended bit depths of 12-bits per pixel or more are commonly used in order to provide sufficient dynamic range to allow a reviewer to detect and diagnose fine details of the image data. To accomplish this, the system used to view the images must be capable of displaying the details of the range of data in the image in a detectable fashion, i.e. shades (or grayscale) of more than 8-bits per pixel. Note that virtually all medical imaging devices, such as imaging modalities, workstations and archive systems use the Digital Imaging and Communications in Medicine (DICOM) standard to store and communicate these images.

The hardware and software of most computer systems, however, are normally capable of handling and viewing images with pixels having no more than 8-bits of data per color channel and most software (operating system, browser, etc.) is designed to only support such images.

Another trend in recent years is the ubiquity of Internet access which is currently growing at a high rate. Data is provided on web sites for secure or open access, allowing the secure access of medical information. The increase of available transmission bandwidth further enables sending images over the network and allows a remote client to view images stored on a server. The popularity of the world wide web created a generation of web browsing software and browsing enhancing tools. These tools are very popular and in widespread use worldwide. Applied to medical image data, however, they suffer from the problem of not being designed to display images having an extended bit depth of more than 8-bits (i.e. the bit depth of the client framework). As a result, the use of medical image data in web based applications is confined to low accuracy representations using low bit-depth images, e.g., browser based, which are typically compressed to 8-bits/channel based JPEGs, PNGs, etc.

In one embodiment, the EBD image server and display mechanism is operative to display an extended bit-depth image on a browser running a multimedia platform such as, Adobe Macromedia Flash, Microsoft Silverlight, Java, etc. Alternatively, the EBD image display mechanism is implemented using a graphics framework such as (1) an OS multimedia API such as DirectX (Windows), Quartz (Mac), etc. or (2) an OS graphic interface such as GDI (Windows), QuickDraw (Mac), GDK (Linux), OpenGL, OpenMAX, etc.

Normally, such browsers, multimedia platforms and graphics frameworks are not capable of handling images having more than 8-bits per channel and thus are only capable of displaying a portion of the full dynamic range of high resolution images. Since the full dynamic range of such images is larger than the available color channel bit-depth, the image quality is significantly reduced and the ability to perform delicate functions such as diagnosing from an x-ray is greatly jeopardized. For example, if the image is a grayscale image and full bit-depth of the high resolution images is 12-bits or 16-bits, such as is frequently found in medical images, the available single color channel only provides an 8-bit depth for grayscale thereby limiting the representation of the image on the display. The image may be local to the system displaying the image or delivered from a remote location or device.

Note that throughout this document, the term client framework is intended to refer to the combination of computer hardware, and/or operating system, and/or browser, and/or multimedia platform, and/or graphics frameworks configured to receive, and/or process, and/or transform and/or display image data. The term client framework is applicable to not only a computer such as a PC, but also to a handheld, laptop, PDA, smartphone, or any device capable of receiving image data, applying a color transform and displaying the resulting image.

The term channel is intended to refer to a certain component of an image. A 24-bit RGB image pixel typically has three channels: red, green and blue, each 8-bits. A 32-bit CMYK image pixel typically has four channels: cyan, magenta, yellow and black, each 8-bits. Pixel data may include an additional channel referred as an alpha channel which stores transparency information. Note that some devices comprise displays having 16-bits of color depth (not 24-bits). In such devices, the color channels are typically 5-bits per channel or for RGB: 5-bits for red, 5-bits for green and 6-bits for blue. High-End handheld devices including the latest smartphones incorporate 24-bit displays.

The term extended bit depth (EBD) image is defined as an image having a channel bit depth greater than what the client framework can handle. In other words, an EBD image represents a number of gray levels greater than what can be handled by the client framework. For example, typical client frameworks can handle 256 levels of gray whereas a typical radiology image contains far more levels of gray (e.g., 4096). For example, client frameworks commonly handle 24 or 32-bit color images having three or four channels of 8-bits per channel. In this case, an EBD image is any image having a channel bit depth greater than 8-bits. Note that typically, an EBD image comprises a single channel (i.e. grayscale image), however, the mechanism is applicable to EBD images of multiple channels as well. Examples of EBD images include high resolution grayscale medical images having a single channel of 12-bits or 16-bits per pixel. Note that although the example client framework bit depth of 8-bits is used to illustrate the principles of the mechanism, the mechanism is applicable to client frameworks having bit depths other than 8-bits, e.g., 5, 6, 7, 10-bits, etc.

The term multi-channel image is defined as an image having a plurality of channels. An example of a multi-channel image is a color image having three 8-bit channels of red, green, blue. Note that references to color image and color image data denote a multi-channel image or multi-channel image data, respectively.

Figure 4:
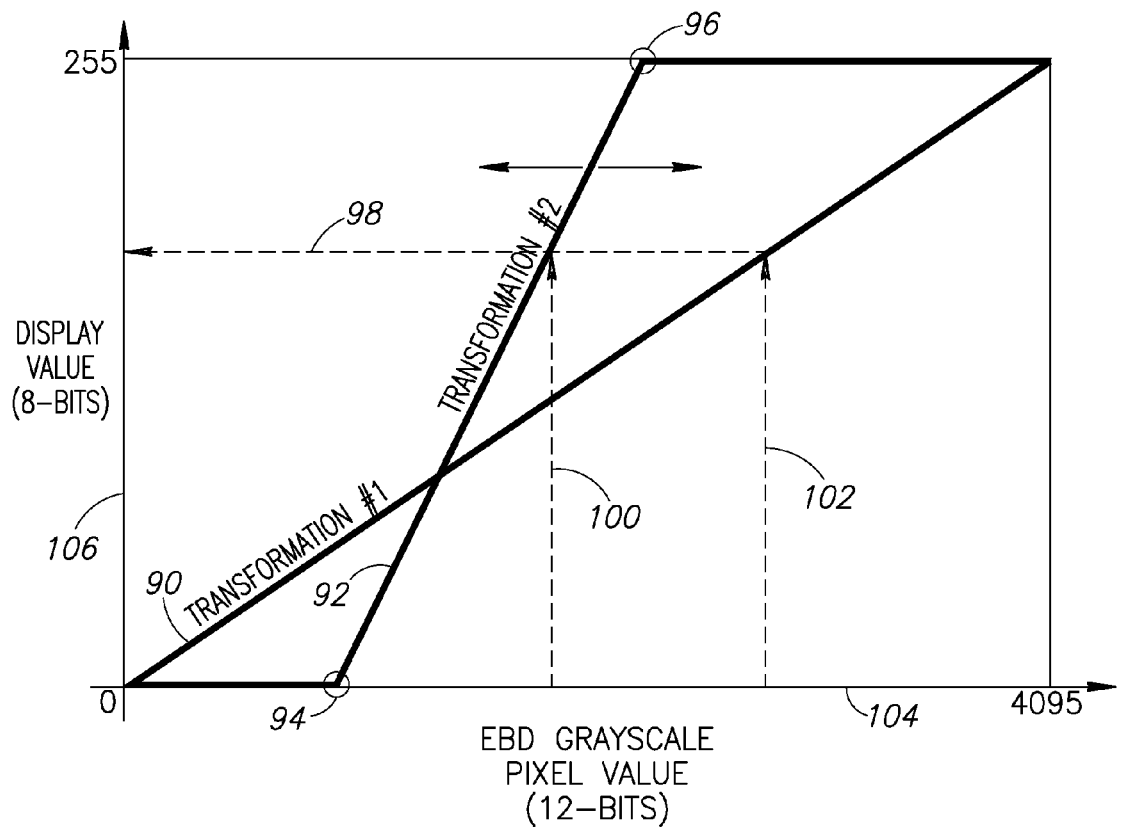
FIG. 4 is an example graph illustrating the values of interest (VOI) transformation.

A graph illustrating the conversion of an EBD grayscale image to a display bit depth that is lower than that of the EBD image is shown in FIG. 4. Such a conversion is commonly referred to as a Values of Interest (VOI) Lookup Table (LUT) transformation (or simply VOI transformation or VOI). Such a transformation is needed in order to view important details of the original EBD high resolution medical images on a lower bit depth display device. Consider a lower display bit depth of 8-bits resulting in display values 106 between 0 and 255. If, for example, we consider an EBD of 12-bits then the pixel values can range from 0 to 4095.

Graph 90 shows an example of a transformation comprising a linear transformation where a minimum EBD pixel value of 0 is converted to 0 display value on the low resolution display, and a maximum EBD pixel value of 4095 is converted to display value 255 in the low resolution display. Values in between are converted as shown in linear fashion by dashed lines 102 and 98 where a grayscale EBD value is converted to a display resolution. The conversion stretches usable output dynamic range linearly over the entire dynamic range of the input data typically resulting in a very grayish image. Note that other transformation functions, including non-linear functions for example, are sometimes used to enhance contrast or for other purposes.

In a second transformation, called a VOI transformation, only a portion of the range of pixel values of the input image are displayed, as shown in graph 92. The portion of the range of pixel values displayed is controlled by the user or viewer by configuring VOI parameters. If the viewer wants to focus on different features in the image, for example bones are usually in the higher portion of the dynamic range (i.e. higher pixel value) while soft tissue is in the lower dynamic range (i.e. lower pixel value), the transformation may be changed and a different graph may be used having a different slope. Graph 92 is dynamic in two aspects: position along the x-axis and slope. The position of sliding points (or cut-off points) 94 and 96 can change and define the slope of graph 92. For example, as point 94 is moved to the left or point 96 is moved to the right, the slope decreases. The slope of 92 increases as point 94 is moved to the right or point 96 is moved to the left. As the slope increases, a smaller range of pixels of the input image are mapped to the 8-bits of the display. Conversely, as the slope decreases, a larger range of pixels of the input image are mapped to the 8-bits of the display. Note that moving point 94 all the way to the left and point 96 all the way to the right results in the first transformation graph 90. Pixels of the image below the lower cutoff point 94 are typically displayed as white (or black) and pixels above the higher saturation point 96 are displayed as black (or white).

The conversion stretches usable output dynamic range over the selected dynamic range of the input data so that the reviewer can focus on the data in that range and review it in full accuracy. Thus, the dynamic range of graph 92 enables the emphasis of VOI of the EBD grayscale image while portions to the right of point 96 are at saturation and to the left of point 94 are at cutoff. This allows a user viewing the EBD grayscale image on the viewer to enhance the VOI at specific areas of the image for better viewing of specific details in an area of interest in the particular image. The image may have multiple areas of interest and may require multiple VOI setups, but since the mechanism makes full EBD data available, such dynamic modification of the VOI can easily be accomplished by the reviewer using web browsing components.

In one embodiment, high resolution EBD grayscale images are sent from the server to the client via the network mapped (i.e. split, encapsulated, etc.) to the plurality of channels of color pixels. This permits browsing software which supports a channel width (i.e. bit depth) smaller than that of the EBD image, for example, 8-bits/channel images, to read the image data and process it.

Figure 5:
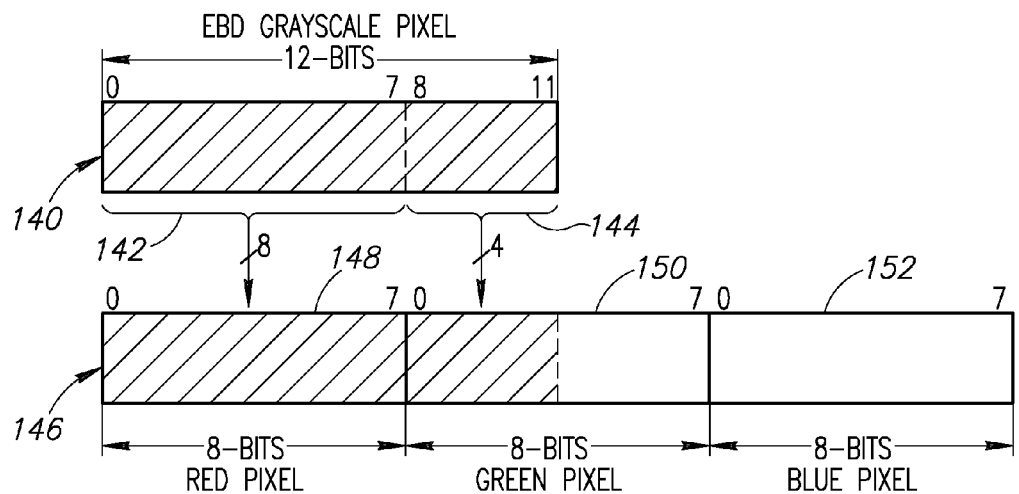
FIG. 5 is a diagram illustrating the mapping of a 12-bit pixel of an EBD grayscale image to the channels of a color pixel.

A diagram illustrating one possible mapping of a 12-bit pixel of an EBD grayscale image to the channels of a color pixel is shown in FIG. 5. The 12-bit original EBD grayscale pixel 140 is segmented into an 8-bit portion 142 and a 4-bit portion 144. The least significant 8-bit portion 142 is loaded (mapped) into the red 8-bit channel 148 of the color pixel 146. The most significant 4-bit portion 144 is loaded (mapped) into the lower four bit positions of the green 8-bit channel 150. The upper four bits of the green channel and the entire 8-bits of the blue pixel 152 are zeroed.

Figure 6:
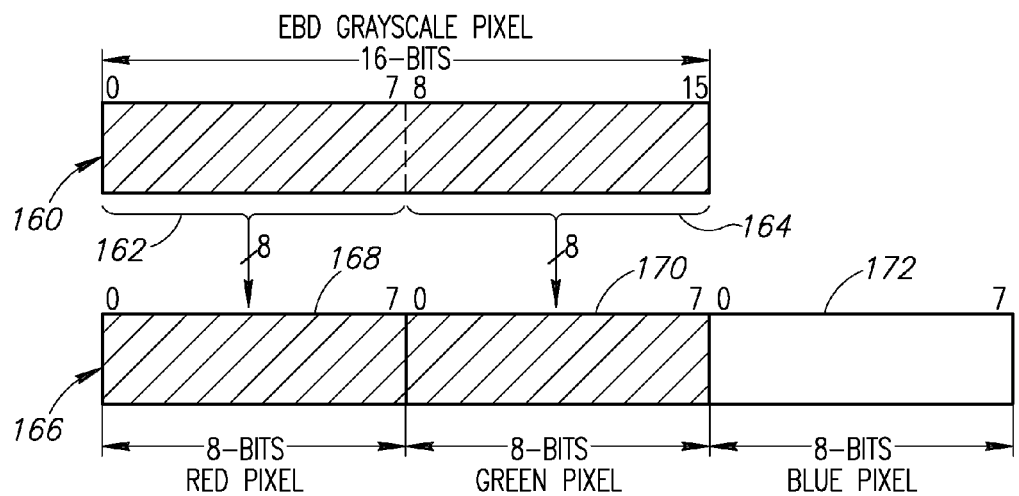
FIG. 6 is a diagram illustrating the mapping of a 16-bit pixel of an EBD grayscale image to the channels of a color pixel.

A diagram illustrating one possible mapping of a 16-bit pixel of an EBD grayscale image to the channels of a color pixel is shown in FIG. 6. The 16-bit original EBD grayscale pixel 160 is segmented into a lower 8-bit portion 162 and an upper 8-bit portion 164. The least significant 8-bit portion 162 is loaded (mapped) into the red 8-bit channel 168 of the color pixel 166. The most significant 8-bit portion 164 is loaded (mapped) into the 8-bits of the green channel 170. The entire 8-bits of the blue pixel 172 are zeroed.

Figure 7:
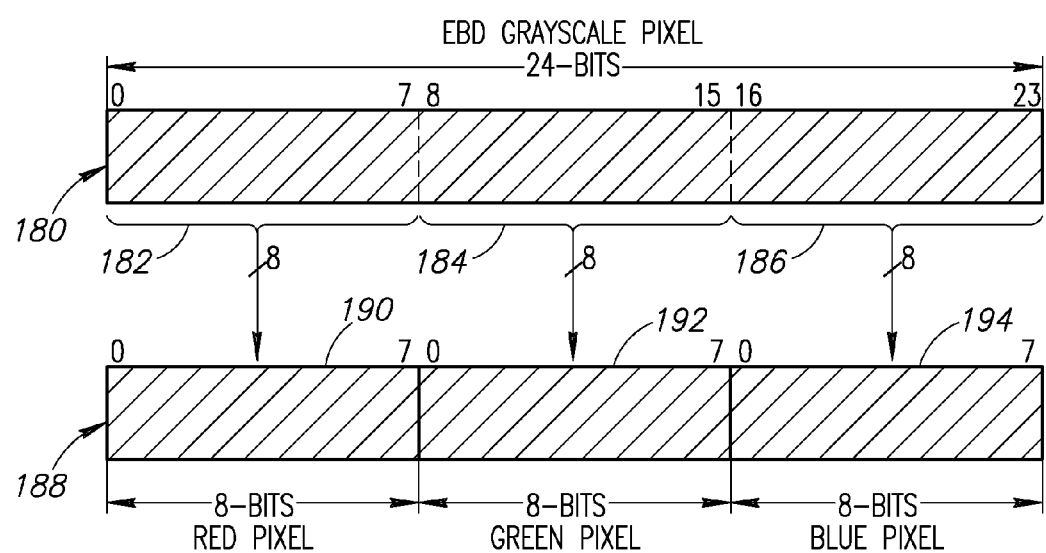
FIG. 7 is a diagram illustrating the mapping of a 24-bit pixel of an EBD grayscale image to the channels of a color pixel.

A diagram illustrating one possible mapping of a 24-bit pixel of an EBD grayscale image to the channels of a color pixel is shown in FIG. 7. The 16-bit original EBD grayscale pixel 180 is segmented into a lower 8-bit portion 182, a middle 8-bit portion 184 and an upper 8-bit portion 186. The lower 8-bit portion 182 is loaded (mapped) into the red 8-bit channel 190 of the color pixel 188. The middle 8-bit portion 184 is loaded (mapped) into the 8-bit green channel 192 and the upper 8-bit portion 186 is loaded (mapped) into the 8-bits of the blue channel 194. In this case, no part of the color pixel 188 is zeroed as all bits are used to convey EBD image data.

Note that the above mappings are provided as an example as other mappings are possible. For example, depending on the depth of the EBD image pixels, less than 8-bits may be assigned to a channel, e.g., in the case of a 14-bits/pixel EBD image, 7 bits can be assigned to the red channel and 7-bits to the green channel. Any desired mapping may be used as long as both the encoder (server) and decoder (client) have knowledge of the mapping. Note further, that while the RGB color space was used for this exemplary and non-limiting example, other component image channels may be used, for example, RGBA, YUV, CMYK and others to achieve the same results.

Figure 8:
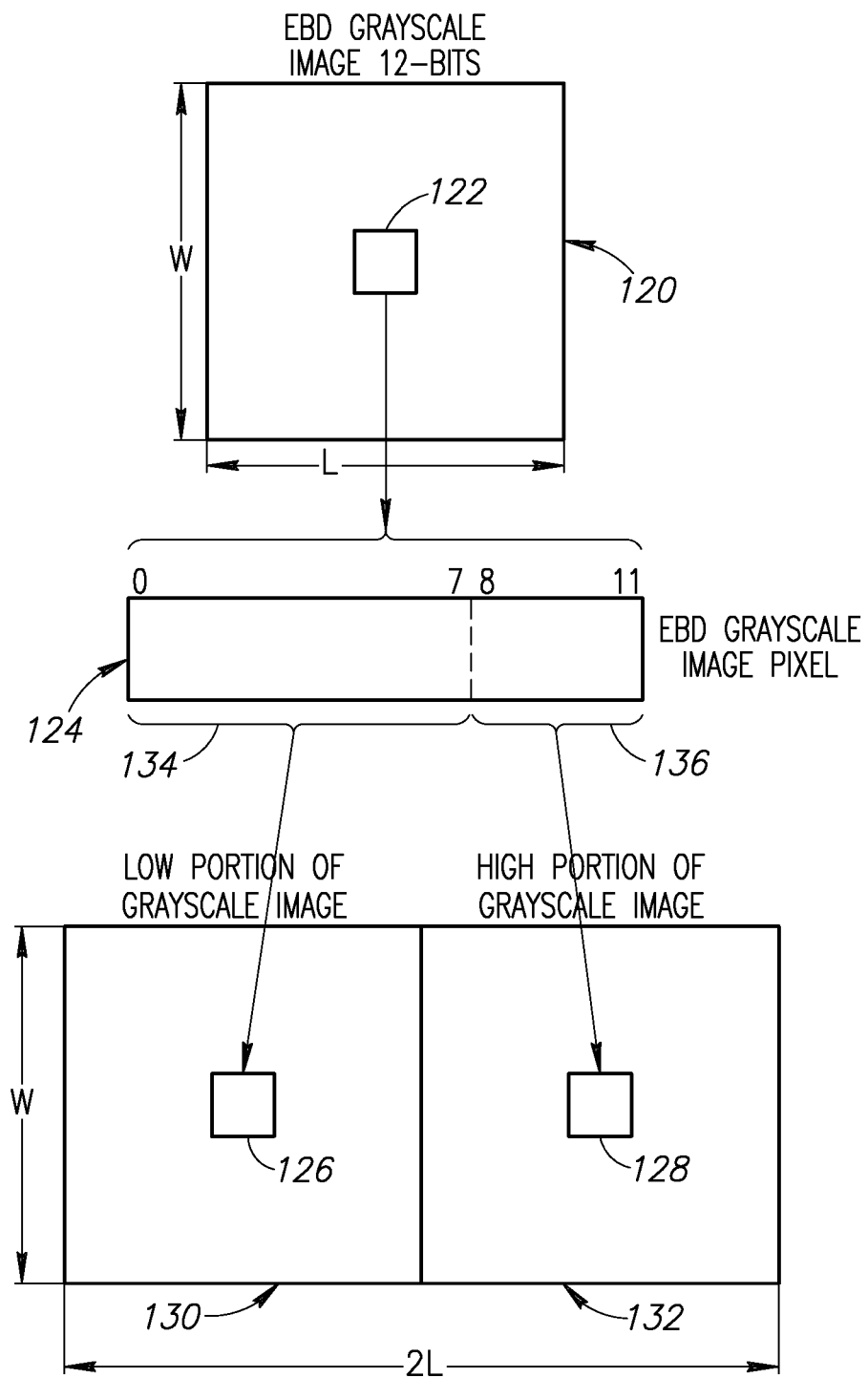
FIG. 8 is a diagram illustrating the mapping of an EBD grayscale image to two grayscale images.

A diagram illustrating the mapping of an EBD grayscale image to two grayscale images is shown in FIG. 8. In an alternative embodiment, an EBD grayscale image 120, having dimensions W×L pixels, has pixels where each pixel 122 has an EBD resolution above a low bit-depth threshold. For example, the EBD resolution is 12-bits while the low bit-depth threshold may be 8-bits.

The EBD image may be doubled in one dimension, to create, for example, a W×2 L image comprising a first image 130 and a second image 132. In the first image, a pixel 126 corresponds in its relative location to pixel 122 of the EBD grayscale image 120. The pixel 126 assumes the least significant bits of the pixel 124 (122), for example, the eight least significant bits 0 through 7 (134). In the second image 132, a pixel 128 corresponds in its relative location to pixel 122 of the EBD grayscale image 120. The pixel 128 assumes the most significant bits of the pixel 122, for example, the four most significant bits 8 through 11 (136).

In this manner, the browsing software receives what it considers a single image comprising image elements 130 and 132. A browser is capable of handling this image since it comprises 8-bit data channels. Software running on the browser, such as ActionScript code, reconstructs the original EBD image from the received image. While splitting the image into two sub-images, it is understood by those of ordinary skill in the art that additional sub-images are possible. For example, in the case of a 24-bit EBD grayscale image, three images can be created each corresponding to a group of 8-bits out of the total 24-bits.

Figure 9:
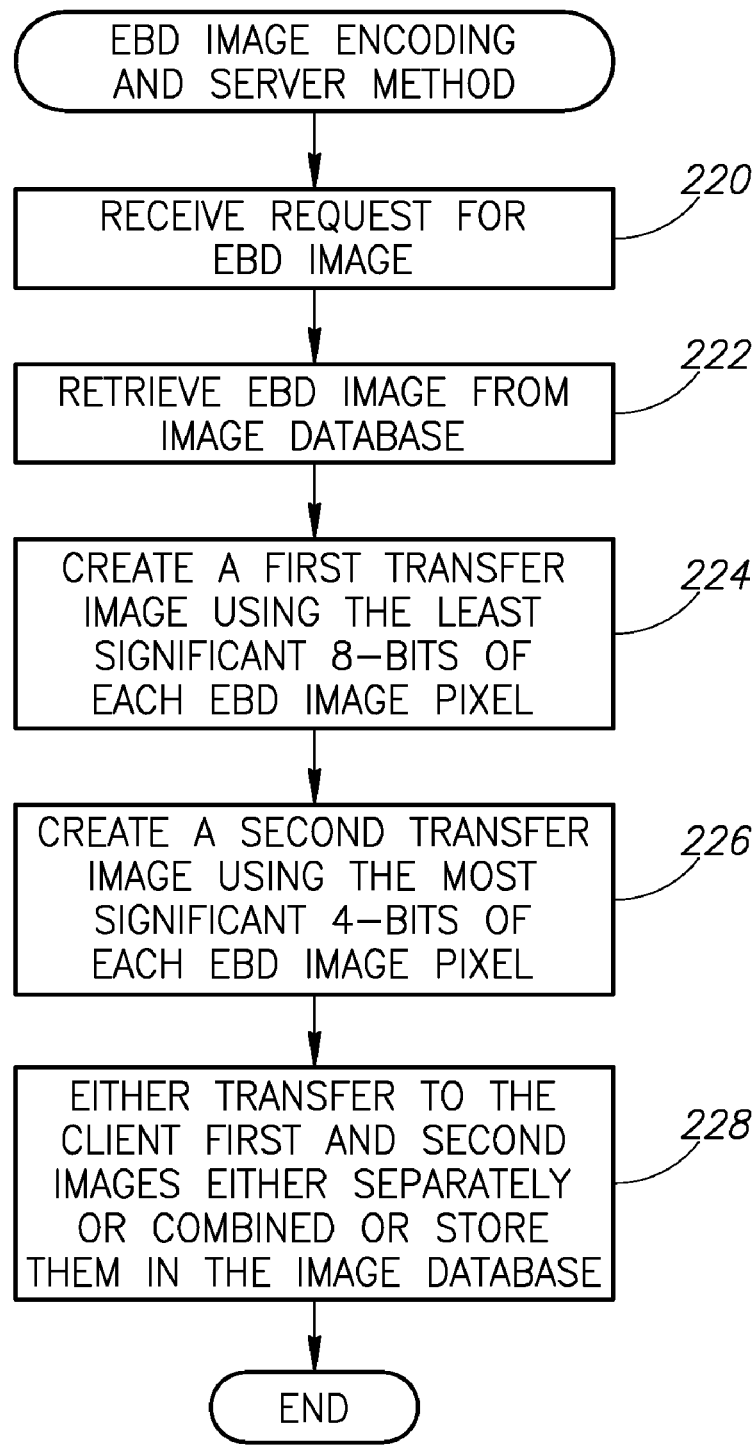
FIG. 9 is a flow diagram illustrating an example EBD image encoding and display method.

A flow diagram illustrating an example EBD image encoding and serving method is shown in FIG. 9. Initially, the server first receives a request for an EBD image (step 220). The EBD image is retrieved from the image database (step 221). The EBD grayscale image has a resolution (e.g., 12-bits in this example) that is above a threshold resolution which in this example is 8 bits, as explained in more details herein above. A first image is created having a bit depth of the least significant 8-bits of the EBD image data (step 222). This can be performed in the color space as described supra with respect to FIGS. 5, 6, 7, or in the grayscale space as explained with respect to FIG. 8. Note that other conversions may also be used without departing from the scope of the mechanism.

A second image containing the higher bits not used for the first image is then created (step 224). It is noted that while two images are described in this example, additional images may be created. Each image created, however, shall not exceed the transferable bit depth threshold (typically 8 bits). The two images are either (1) transferred to storage (e.g., to the image database) on the server or (2) transferred to a requesting client, either separately or combined (step 226). The combination may be a sequence of RGB data, YUV data, sequence of low-resolution grayscale images such as shown with respect to FIG. 8, etc. In one embodiment, the transferred images are created by the server upon request from the client or may be partially created by the server at the time of the request to accommodate the requested viewable area. Other combinations may be implemented too and are contemplated by the mechanism.

Figure 10:
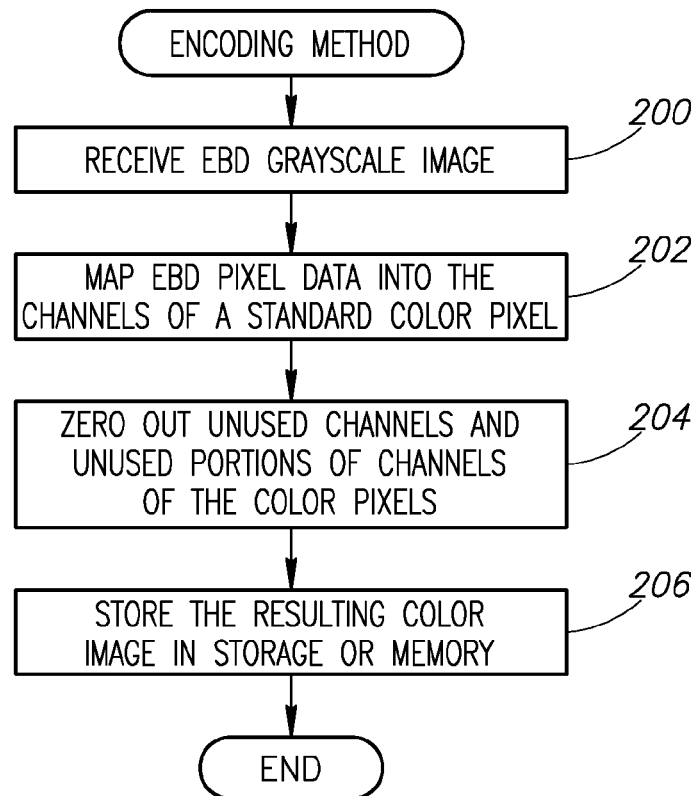
FIG. 10 is a flow diagram illustrating an example EBD image encoding method.

A flow diagram illustrating an example EBD image encoding is shown in FIG. 10. In a client-server scenario, as described in connection with FIG. 1, the server initially receives an EBD grayscale image (step 200). Once received, the server than maps (i.e. splits, loads, etc.) the extended bit depth pixel data of the EBD image into the plurality of channels of a color pixel (step 202). The actual mapping of the pixel data into channels performed by the server is dependent on the bit depth of the EBD image. Examples of mapping of 12-bit, 16-bit and 24-bit EBD images were described supra in connection with FIGS. 6, 7, 8, respectively.

Any unused channels or portions of unused channels of the color pixels are zeroed out (step 204). Note that depending on the particular implementation (i.e. how the images are stored, the process implemented at the server and client, etc.), step 204 may be optional. For example, the unused channels and portions of unused channels may be left as is or written with non-zero data. The resulting color image may be then stored as a file in storage or stored in memory (step 206). In one embodiment, the color image is stored in standard PNG image format to facilitate transfer over the web to a client. Thus, EBD images are converted to multi-channel images (e.g., color images) as they are received at the server and may be stored as files (e.g., color image files) in storage or in memory.

Figure 11:
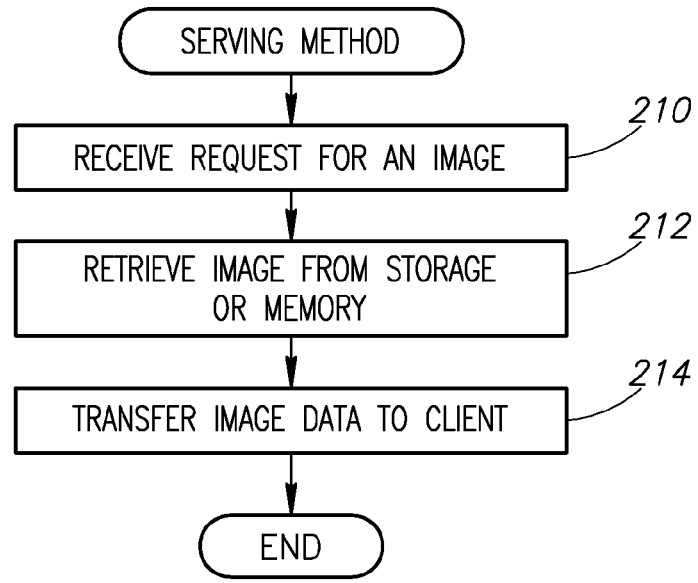
FIG. 11 is a flow diagram illustrating an example serving method.

A flow diagram illustrating an example serving method is shown in FIG. 11. Clients requesting to view an EBD image generate a request and send it to the server. Note that alternatively, the server can initiate the serving process without a request for EBD image data from a client. In response to the client request (step 210) (or a trigger from any other source), the server retrieves the associated image from storage (step 212) and sends it to the client over the network (step 214).

Note that depending on the client implementation, the image retrieved and sent to the client may comprise a EBD image or a multi-channel image (e.g., color image). Thus, depending on the implementation, the client may request from the server either (1) the EBD image, which in this case, the client performs the pixel mapping (in real time, for example) rather than the server before applying a color transform; or (2) the color image, wherein the client applies the color transform as the mapping was performed a priori by the server. In a push mode, the server may initiate an image transfer to the client without a request, for example, when a new image window is opened on the client or in response to some other trigger source.

Assuming a color image (as opposed to the original EBD image) is requested by the client, in order to display the VOI transformed EBD grayscale image in a web browser, regardless of the method of transmission to the client, a color transform is applied to the channel information conveyed in the received color pixel image data. For example, in the case the original EBD image was mapped into the red-channel for the least significant bits and the green channel for the most significant bits then the EBD grayscale pixel value P is calculated as follows:

$$P = R + 256*G \quad (1)$$

where R represents the value of the contents of the red channel and G represents the value of the contents of the green channel. For the case of a 24-bit EBD grayscale pixel the EBD grayscale pixel value P can be calculated as follows:

$$P = R + 256*G + 65536*B \quad (2)$$

It is appreciated that one skilled in the art can readily adapt these conversions to the particular mapping used in the encoding and serving process to calculate the reconstructed pixel value P.

In another embodiment, the actual reconstruction of the EBD grayscale image by calculating the actual value P of the pixels is not performed. Rather, the individual channel contents of the color pixels are used to directly calculate a display image by applying a color transformation. For illustration purposes only, consider a 16-bit EBD image, whereby the lower 8-bits are mapped to the red channel of a color image and the upper 8-bits are mapped to the green channel. It is assumed the color channels are supported by web browsers running a multimedia platform and/or by graphics frameworks. In this example, the blue and alpha channels remain unused and may have been zeroed, depending on the implementation.

The output value D of the display pixel is calculated utilizing the channel information contained in the pixel and the two VOI parameters: Width (W) and Center point (C). Consider the case of a 32-bit image with four channels: Red (R), Green (G), Blue (B) and Alpha (A); and a 16-bit EBD grayscale image where L and H represent the lower and upper bytes of an unsigned EBD grayscale pixel whose values range between 0 to 65535. At the encoder (e.g., server), the grayscale image data is copied to the color image as follows:

L→R
H→G
0→B
0→A

In the decoder (e.g., the client side), a color transformation is performed to yield the resulting grayscale image taking in account the desired C (center point) and W (width) settings (i.e. VOI settings). The resulting grayscale pixel value D of the color transformed data in this case is given by the following expression:

$$D = \frac{256}{W}\left[R + 256*G - \left(C - \frac{W}{2}\right)\right] \quad (3)$$

Note that the value D is restricted (i.e. clipped) to values between zero and 255, and therefore if D≧255 then D=255 and if D≦0 then D=0.

The term $$\left(C - \frac{W}{2}\right) \quad (4)$$

represents the value on the x-axis when an input EBD pixel results in an output D that is equal to zero (i.e. the left border of the contrast window—shown as black). Note that the right border of the contrast window (shown as white) is given by $$\left(C + \frac{W}{2}\right).$$

The term $$\frac{256}{W} \quad (5)$$

represents the VOI transformation slope, where 256 is the bit depth limitation of the display (e.g., 8-bits). The output value D is then clipped to be within the allowed range, in this case, between 0 and 255.

Consider the case of a 32-bit image with four channels: R, G, B, A and a 24-bit EBD grayscale image where L, M and H represent the lower, middle and upper bytes of an unsigned single EBD grayscale pixel whose values range between 0 to $2^{24}-1$. At the encoder (i.e. server), the grayscale image data is copied to the color image as follows:

L→R
M→G
H→B
0→A

On the client side, a color transformation is performed to yield the resulting grayscale image taking in account the desired C (center point) and W (width) settings (i.e. VOI settings) of the user. The resulting grayscale pixel value D of the color transformed data in this case is given by the following expression:

$$D = \frac{256}{W}\left[R + 256*G + 65536*B - \left(C - \frac{W}{2}\right)\right] \quad (6)$$

As in the case of 16-bit EBD image, the value D is restricted (i.e. clipped) to values between zero and 255, and therefore if D≧255 then D=255 and if D≦0 then D=0.

It is noted that the transform presented in Equations 3 through 6 are for illustration purposes as one skilled in the art can apply numerous other transforms to the received image data. The VOI transform is presented as one example of how to transform pixels of the received image to the capabilities of the display while taking into account desired user viewing settings or parameters. The mechanism contemplates numerous other transforms that function to convert or transform image pixels to the capabilities of the display in accordance with user desired viewing settings or parameters. Examples include, but are not limited to, grayscale transformation, display transformation, presentation transformation, etc.

Figure 12:
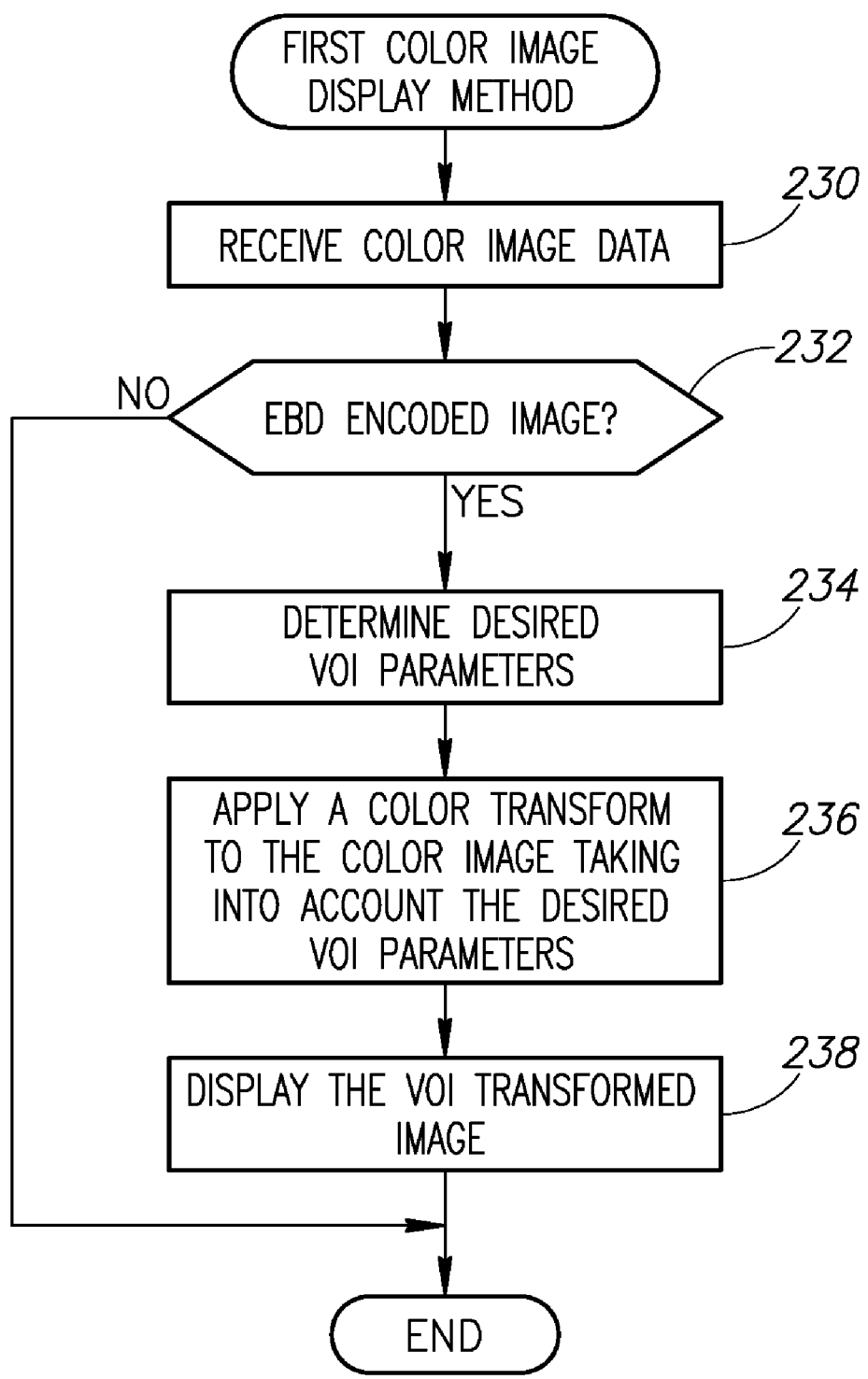
FIG. 12 is a flow diagram illustrating a first example color image display method.

A flow diagram illustrating a first example color image display method is shown in FIG. 12. In this example, the EBD image was previously mapped to a color image by the server and written to storage or stored in memory. In this case, the client makes a request for a particular EBD image. In response, the server retrieves the associated color image (wherein the EBD pixels have been mapped a priori or in real time to color pixels encoded in 8-bits/channel) and sends it the client over the network. The client receives the color image data from the server (or, alternatively, via any other suitable means as described infra) (step 230). If it is not an EBD encoded image (step 232) the method ends. If it is, the desired VOI parameters are then determined (i.e. retrieved, etc.) (step 234). These settings are used in the color transformation that is applied to the color image.

The color transformation is applied to the color image data whereby display pixels are calculated based on the color image data contents (color pixel channel data) and the VOI parameters (step 236). The resulting VOI transformed display image is then displayed (step 238). The color transformation is performed using code written in the language of the multimedia platform or by calls to the graphics framework.

Since the display pixels calculated by the color transform now match the framework and display capabilities, the image can be displayed. Considering a Flash enhanced browser as an example, the received color image data is input to a Flash based color transform as a color image. The built-in color transformation capability of the Flash tool, for example, is used to run commands in Flash ActionScript language to transform the image to a displayable 8-bit grayscale image that takes into account the specified VOI settings. The Flash code executes the color transform as expressed, for example, in Equations 3 or 6. In the case where the entire grayscale image is transferred to the Flash player, it is then possible to reconstruct for display a high quality grayscale image, and to allow a reviewing person to focus on any portion and any required detail of the image by appropriately modifying the VOI parameters C and W interactively.

It is noted that in one embodiment, although the EBD image is mapped to the channels of a color image which is then transmitted to the client, the application of the color transform results in a monochrome image being displayed. To display a grayscale image, the display pixel results D of the color transform (e.g., a value 0 to 255) are duplicated in the red, green and blue channels. It is appreciated that display images other than grayscale are possible by appropriate allocation of the resulting display pixels D to the RGB channels of the color image.

Note that in an alternative embodiment, only portions of the high resolution image are transferred to the client. For example, portions of the image can be transferred in accordance with the particular Regions of Interest (ROIs) requested. Sending image data for the ROIs only reduces the bandwidth required between the client and server and also enables the user to more quickly see the portions of interest of the image.

Figure 13:
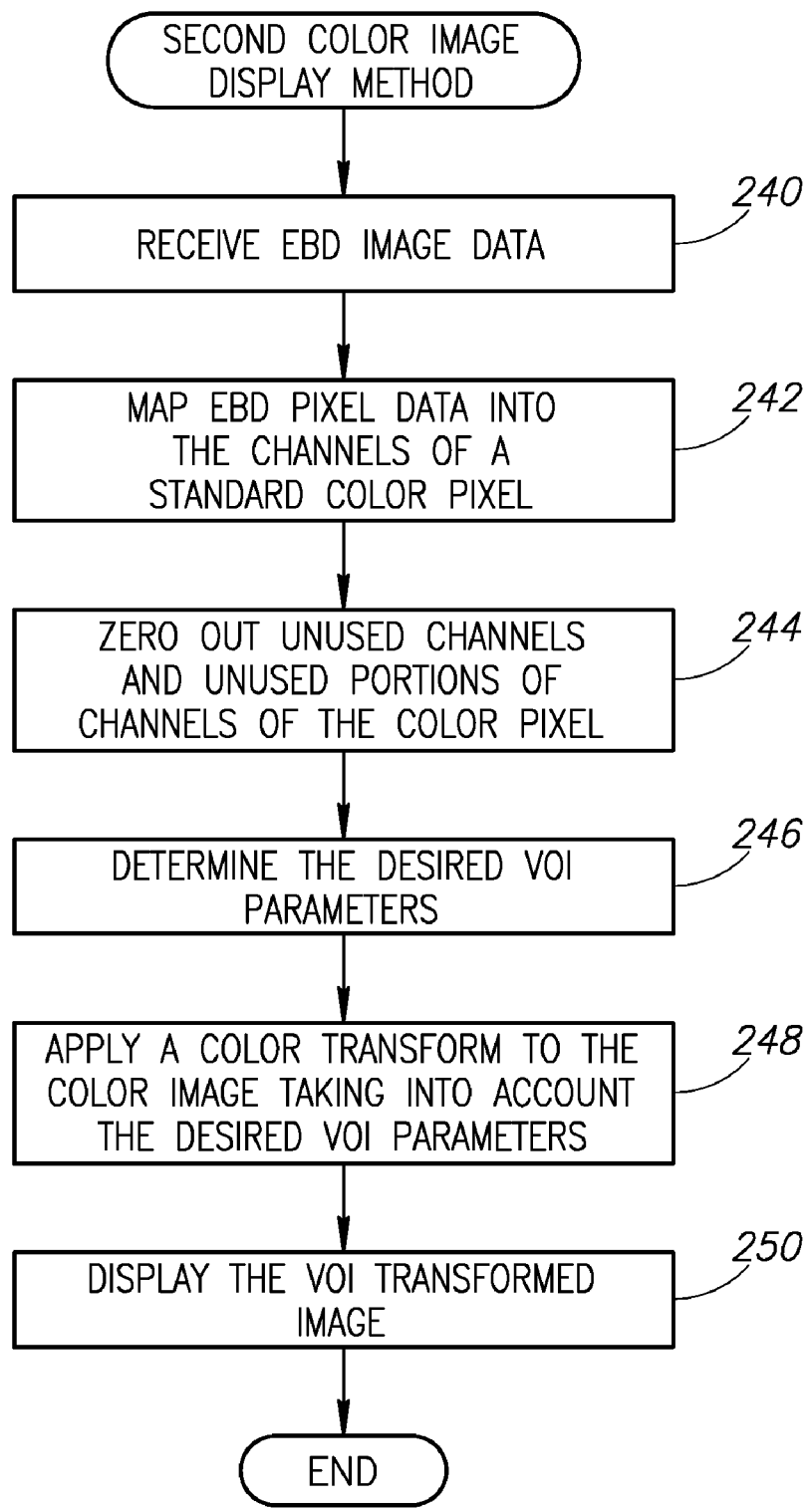
FIG. 13 is a flow diagram illustrating a second example color image display method.

A flow diagram illustrating a second example color image display method is shown in FIG. 13. In this method, the color image data is not generated a priori nor in real time by the server but rather is generated at the client, such as on demand or other timing. Thus, in this case, the client makes a request to the server for the EBD image pixel data rather than the color image. In response, the server sends the EBD image to the client. The client receives the EBD image data (step 240) from the server (or, alternatively, via any other suitable means as described infra).

Once received, the client then performs the encoding of the image whereby the extended bit depth pixel data of the EBD image is mapped (i.e. split, loaded, etc.) into the plurality of channels of a color pixel (step 242). The actual mapping of the pixel data into channels is dependent on the bit depth of the EBD image. Any unused channels or portions of unused channels of the color pixels may be zeroed out (step 244). The resulting output is a color image that the client framework supports and can manipulate.

The desired VOI parameters are then determined (i.e. retrieved, etc.) (step 246). These settings are used in the color transformation that is applied to the color image. The color transformation is applied to the color image data whereby display pixels are calculated based on the color image data contents (color pixel channel data) and the VOI parameters (step 248). The resulting image is then displayed (step 250). The color transformation is performed using code written in the language of the multimedia platform or graphics framework.

Figure 14:
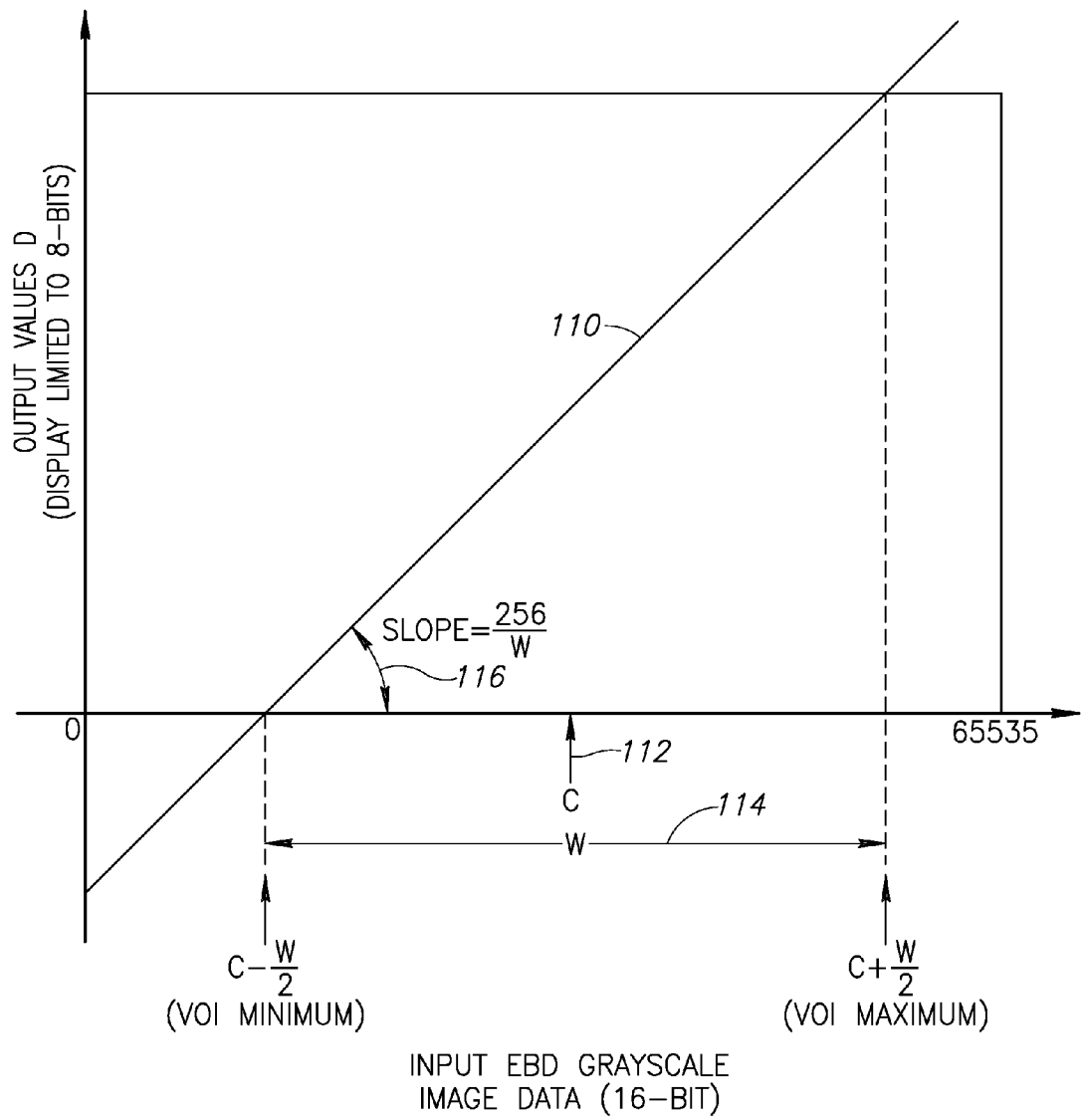
FIG. 14 is a graph illustrating the operation of the VOI controls C and W.

A graph illustrating the operation of the VOI controls C and W is shown in FIG. 14. For example, the graph 110 uses the two VOI parameters: width (W) 114 and center point (C) 112 on the x-axis. These are commonly referred to in the art as Window Center (WC) and Window Width (WW), respectively. The slope 116 of the line 110 is given by 256/W, where 256 is the bit-depth of the display in this case. Other client devices such as handhelds may have lower output range while special hardware such as dedicated radiology workstations may have higher output range. The VOI minimum, below which pixels are displayed as black, is $$\left(C - \frac{W}{2}\right).$$

The VOI maximum, above which pixels are displayed as white, is $$\left(C + \frac{W}{2}\right).$$

Thus, the EBD image server mechanism converts the EBD grayscale image (i.e. its pixels mapped) to, for example, a color image in which each channel of the color image holds a partial range of the bits of the EBD grayscale image. Once received at the client, the color image is loaded into a multimedia platform or graphics framework capable of programmatically processing and transforming the color image for display by application of a color transform as described supra. The color transform is defined in accordance with a user's desired VOI (i.e. W and C settings). The color transform is applied to the received image data to convert the received color channel information to a grayscale resolution capable of being displayed by the framework, which is typically 8-bits, but which may be other than 8-bits. The resultant grayscale image is then displayed.

To illustrate the principles of the mechanism, example code is written in ActionScript language for the Adobe Flash Player. When implemented using ActionScript, the complete color transformation of Equation 3 is represented by a 4×5 matrix operator as in Equation 7 below:

$$D = \begin{bmatrix} 256/W & 66536/W & 0 & 0 & (W/2 - C)/W * 256 \\ 256/W & 66536/W & 0 & 0 & (W/2 - C)/W * 256 \\ 256/W & 66536/W & 0 & 0 & (W/2 - C)/W * 256 \\ 0 & 0 & 0 & 1 & 0 \end{bmatrix} P \quad (7)$$

Where D is a display image color pixel represented as a 4 elements vector having each element a color channel (R, G, B, A) and P is a color pixel in a color image created from an EBD image using the same representation (described infra). This color transform matrix is then attached to a MovieClip as a BitmapFilter as detailed in the following code excerpt. The SetVoiLut16 function applies the color transform to a color image held in memory by the input parameter mc:

Listing 1: Function to apply a color
transform to an input color image

```
public function SetVoiLut16 (mc:MovieClip) : void
{
    var matrix:Array = new Array( );
// fill the matrix elements of the first line for the red channel
    matrix = matrix.concat([256/ww, 65536/ww, 0, 0,
        (ww/2-wc)/ww*256]);
// fill the matrix elements of the second line for the green channel
    matrix = matrix.concat([256/ww, 65536/ww, 0, 0,
        (ww/2-wc)/ww*256]);
// fill the matrix elements of the third line for the blue channel
    matrix = matrix.concat([256/ww, 65536/ww, 0, 0,
        (ww/2-wc)/ww*256]);
// fill the matrix elements of the fourth line for the alpha channel (zeroed
out)
    matrix = matrix.concat([0, 0, 0, 1, 0]);
// generate the new filter (i.e. color transform)
    var filter:BitmapFilter = new ColorMatrixFilter(matrix);
// apply the new filter
mc.filters = new Array(filter);
}
```

Note that in Listing 1 above, the variable 'ww' represents the window width W and the variable 'wc' represents the window center C, as described supra. Note further that this technique, as described hereinabove, can be implemented in a standalone client station or in a client-server architecture. In one embodiment, a user may adjust the VOI transform, as shown in connection with FIGS. 4 and 14, to continuously change the displayed image.

In one embodiment, the color transform (e.g., Equations 3 and 6) can be applied on the client side by a graphic processing unit (GPU) on a client computer, using multimedia platform code or graphics framework code. This makes execution of the color transform extremely efficient in terms of computing resources and very quick such that the entire color transformation is perceived as being executed in real time in the eyes of the user. This enables the browser multimedia platform to perform the color transformation virtually instantly even while the user interactively modifies VOI settings. This allows for a seamless adjustment by the reviewer to obtain an optimized viewing setting for an area of interest in the image. The continuously real-time adjustment holds true for either a single image (such as an x-ray) as well as a sequence of grayscale images (or video stream) that are displayed in a loop, such as in catheterization images (XA), computed tomography (CT) images or magnetic resonance imaging (MRI) images.

It is noted that while an exemplary multimedia platform framework has been discussed (i.e. Macromedia Flash), other multimedia platforms and/or graphics frameworks, such as Silverlight, Java, etc. as well as other non-Internet based frameworks such as GDI, GDK, DirectDraw, Quartz, DirectX, OpenGL, OpenMAX, etc. may be used without departing from the scope of the mechanism.

Therefore, in one embodiment the mechanism is operative to transfer the EBD image data from a server to a client (for example a Flash client) by repackaging the original EBD image in a manner that is supported by the Flash client (i.e. mapping to a color image). In another embodiment, an EBD image is provided to the client "as is", or is read from a local file, local memory, thumb drive, etc. on the computer and both the mapping of pixel data as well as the color transformation of the resulting color image as supported by the Flash client takes place locally. The client is capable of performing the color transformation as described supra, in order to display high bit-depth images. Thus, it is not critical how the client receives the EBD image data or color image data. The source for the EBD or color image data may be from any suitable source, including for example, a remote server, a remote database, local memory of a client computer, local storage of a client computer, local memory of a mobile communications device, local storage of a mobile communications device, etc.

In another embodiment, a EBD source image is divided into multiple levels of resolutions. For example, if the input is an image of 2048×2048 pixels each pixel having an EBD of 12-bits, then, for example, a pyramid of images is created where a next level comprises four images each being 1024×1024, wherein each pixel has an EBD of 12-bits, and so on. For each grayscale image, a corresponding image is created in accordance with the principles of the mechanism described supra. Upon viewing, for each view position, the correct level of resolution is identified and the relevant part of the image holding the viewable area (typically smaller than the entire image) are transferred. In the current instance this involves the transfer of for example the color images that were loaded with the 12-bits of grayscale data of the view area in accordance with the principles of the mechanism. This permits the transfer and display of part of the image representing the relevant view position, which may well be much smaller than the full size of the EBD image, thus reducing the required transmission bandwidth and/or time to display the image.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of one or more embodiments of the invention. The embodiments were chosen and described in order to best explain the principles and the practical application, and to enable others of ordinary skill in the art to understand the one or more embodiments of the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of encoding an extended bit depth (EBD) image, said method comprising:
    receiving EBD image data;
    mapping said EBD image data into a plurality of channels of pixels of a multi-channel image for transporting over a network; and
    wherein the bit depth of said EBD image is unchanged by said mapping.

2. The method according to claim 1, wherein said multi-channel image is stored in a storage system or in memory.

3. The method according to claim 1, wherein the bit depth of said EBD image is greater than that of a channel of a client framework.

4. The method according to claim 1, wherein said extended bit depth is greater than 8-bits.

5. The method according to claim 1, wherein the channel bit depth of said multi-channel image is less than or equal to that of the channels of a client framework.

6. The method according to claim 1, wherein each channel comprises 8-bits.

7. The method according to claim 1, wherein the bits of said EBD image pixels are divided over said plurality of channels, each channel having a bit depth less than or equal to that of the channels of a client framework.

8. The method according to claim 1, wherein said channels correspond to a color scheme selected from the group consisting of: RGB, YUV, RGBA.

9. The method according to claim 1, further comprising zeroing out unused channels and unused portions of channels.

10. A method of encoding an extended bit depth (EBD) image, said method comprising:
    receiving EBD image data having a bit depth greater than 8-bits;
    mapping said EBD image data into a plurality of 8-bit channels of pixels of a multi-channel image for transporting over a network, said multi-channel image having a combined bit depth equal to or greater than that of said EBD image; and
    wherein the bit depth of said EBD image is unchanged by said mapping.

11. A method of serving extended bit depth (EBD) images to one or more clients, said method comprising:
    retrieving said EBD image data from storage;
    transmitting said EBD image data to said client over a network, wherein said EBD image is mapped to a plurality of channels for transport over said network;
    wherein the bit depth of said EBD image is greater than that of a channel of said client; and
    wherein the bit depth of said EBD image is unchanged by said mapping.

12. The method according to claim 11, wherein the retrieving and transmitting of said EBD image is initiated in response to a request for EBD image data received from said client.

13. The method according to claim 11, wherein said extended bit depth is greater than 8-bits.

14. The method according to claim 11, wherein each channel of said multi-channel image comprises 8-bits.

15. A method of serving extended bit depth (EBD) images to one or more clients, said method comprising:
    transmitting multi-channel image data corresponding to said EBD image data over a network, said EBD image data mapped into a plurality of channels of pixels of said multi-channel image for transporting over said network; and
    wherein the bit depth of said EBD image is unchanged by said mapping.

16. The method according to claim 15, wherein transmitting said EBD image is initiated in response to a request for EBD image data received from said client.

17. The method according to claim 15, wherein the bit depth of said EBD image is greater than that of a channel of said client.

18. The method according to claim 15, wherein said extended bit depth is greater than 8-bits.

19. The method according to claim 15, wherein the bit depth of each channel of said multi-channel image is less than or equal to that of the channels of said client.

20. The method according to claim 15, wherein each channel of said multi-channel image comprises 8-bits.

21. The method according to claim 15, wherein the channel bit depth of said multi-channel image is less than or equal to that of the channels of a client framework.

22. The method according to claim 15, wherein said channels correspond to a color scheme selected from the group consisting of: RGB, YUV, RGBA.

23. A server for serving extended bit depth images to one or more clients, comprising:
    a storage system for storing multi-channel images, each multi-channel image generated by mapping corresponding EBD image data into a plurality of channels of a multi-channel image for transporting over a network, wherein the bit depth of said EBD image is unchanged by said mapping;
    a network interface operative to connect said server to said network;
    a memory including a program operative to receive requests for EBD images from clients, retrieve multi-channel images corresponding to said requested EBD images from said storage system, and transmit said multi-channel images over said network to the requesting client; and
    a processor for executing said program.

24. The server according to claim 23, wherein the bit depth of said EBD image is greater than that of a channel of said client.

25. The server according to claim 23, wherein said extended bit depth is greater than 8-bits.

26. The server according to claim 23, wherein the channel bit depth of said multi-channel image is less than or equal to that of the channels of said client.

27. The server according to claim 23, wherein each channel of said multi-channel image comprises 8-bits.

28. The server according to claim 23, wherein the bits of said EBD image pixels are divided over said plurality of channels, each channel having a bit depth less than or equal to that of the channels of said client.

29. The server according to claim 23, wherein said channels correspond to a color scheme selected from the group consisting of: RGB, YUV, RGBA.

30. A server for serving extended bit depth images to one or more clients, comprising:
    a storage system for storing multi-channel images, each multi-channel image generated by mapping corresponding EBD image data into a plurality of channels of a multi-channel image for transporting over a network, wherein the bit depth of said EBD image is unchanged by said mapping;
    a server operative to:
        retrieve a multi-channel image corresponding to said EBD image from said storage system; and
        transmit said multi-channel image to said client over said network.

31. The server according to claim 30, wherein retrieving and transmitting said EBD image is initiated in response to a request from said client for EBD image data.

32. The server according to claim 30, wherein the bit depth of said EBD image is greater than that of a channel of said client.

33. The server according to claim 30, wherein said extended bit depth is greater than 8-bits.

34. The server according to claim 30, wherein the channel bit depth of said multi-channel image is less than or equal to that of the channels of said client.

35. The server according to claim 30, wherein each color channel comprises 8-bits resulting in a multi-channel image a web browser is capable of handling.

36. The server according to claim 30, wherein the bits of said EBD image pixels are divided over said plurality of channels, each channel having a bit depth less than or equal to that of the channels of said client.

37. The server according to claim 30, wherein said channels correspond to a color scheme selected from the group consisting of: RGB, YUV, RGBA.

38. A computer program product characterized by that upon loading it into computer memory a method of serving extended bit depth (EBD) images to one or more clients is executed, the computer program product comprising:

- a non-transitory computer usable medium having computer usable program code embodied therewith, the computer usable program code comprising:
- computer code configured to retrieve multi-channel image data corresponding to said EBD image data from storage, said EBD image data mapped a priori into a plurality of channels of said multi-channel image for transporting over a network, wherein the bit depth of said EBD image is unchanged by said mapping; and
- computer usable code configured to transmit said multi-channel image data to said requesting client over said network.

* * * * *